United States Patent [19]

Cabrera

[11] Patent Number: 6,025,427
[45] Date of Patent: Feb. 15, 2000

[54] COLLOID DISPERSION MIXTURES AS PROTECTIVE COLLOID FOR AQUEOUS EMULSION POLYMERIZATION, PROCESSES FOR PREPARING THEM AND THEIR USE

[75] Inventor: Ivan Cabrera, Dreieich, Germany

[73] Assignee: Clariant GmbH, Frankfurt, Germany

[21] Appl. No.: 09/126,354

[22] Filed: Jul. 30, 1998

[30] Foreign Application Priority Data

Jul. 31, 1997 [DE] Germany ............... 197 33 077

[51] Int. Cl.⁷ .................................. C08L 37/00
[52] U.S. Cl. ........................... 524/458; 524/555
[58] Field of Search ................ 524/800, 548, 524/555

[56] References Cited

U.S. PATENT DOCUMENTS

| | | | |
|---|---|---|---|
| 3,673,142 | 6/1972 | Saunders | 260/29.6 |
| 3,965,032 | 6/1976 | Gibbs | 252/306 |
| 4,094,841 | 6/1978 | Mani | 260/29.6 |
| 4,338,237 | 7/1982 | Sulzbach | 524/777 |
| 4,369,266 | 1/1983 | Kuhls | 523/332 |
| 4,384,092 | 5/1983 | Blaise | 526/225 |
| 4,384,096 | 5/1983 | Sonnabend | 526/313 |
| 4,421,660 | 12/1983 | Hajna | 252/62.54 |
| 4,680,200 | 7/1987 | Solc | 427/213.34 |
| 4,692,493 | 9/1987 | Sulzbach | 524/805 |
| 5,124,394 | 6/1992 | Lenney | |
| 5,470,903 | 11/1995 | Lenney et al. | |
| 5,705,302 | 1/1998 | Ohno | 430/7 |
| 5,844,039 | 12/1998 | Scranton | 524/530 |

FOREIGN PATENT DOCUMENTS 4327514   2/1995   Germany.

OTHER PUBLICATIONS

European Search Report.
Derwent Patent Family Report and/or Abstract.
Sutapa Ghosh and N. Krishnamurti, "Protective Colloids and Their Effects on Polyvinyl Acetate Emulsions", Jan./Feb. 1996—Paint & Ink International, pp. 19–21.

Primary Examiner—Paul R. Michl
Attorney, Agent, or Firm—Philip P. McCann

[57] ABSTRACT

Novel colloid dispersion mixtures as protective colloid for aqueous emulsion polymerization, processes for preparing them and their use.

The present invention relates to novel colloid dispersion mixtures comprising a water-soluble monomer and a water-insoluble comonomer, to processes for their preparation and to their use as protective colloid for emulsion polymerization.

13 Claims, No Drawings

COLLOID DISPERSION MIXTURES AS PROTECTIVE COLLOID FOR AQUEOUS EMULSION POLYMERIZATION, PROCESSES FOR PREPARING THEM AND THEIR USE

BACKGROUND OF THE INVENTION

The invention relates to novel colloid dispersion mixtures comprising a water-soluble monomer and a water-insoluble comonomer, to processes for their preparation and to their use as protective colloid for emulsion polymerization in water.

Protective colloids are normally water-soluble polymer compounds which are employed for conducting an emulsion polymerization and then for stabilizing the finely dispersed polymer particles.

Typical protective colloids are, for example, polyvinyl alcohols or cellulose derivatives. Protective colloids, owing to their structure, are in part incorporated into the polymer as it forms in the course of emulsion polymerization. In this case one speaks of a graft polymerization. As a result, dispersions stabilized by protective colloid are often much more stable to mechanical loads than are emulsifier-stabilized dispersions.

In aqueous polymer dispersions it is normal to use as protective colloids very hydrophilic polymers, such as poly(vinyl alcohol), poly(ethylene oxide) or poly(vinylpyrrolidone) (Gosh, S.; Krishnamuti, N., Paint & Ink International, Jan–Feb. 19, 1996). Other synthetic copolymers which have also been used as protective colloids are poly(alkyl-oxazolines), U.S. Pat. No. 5,124,394, and poly(N-vinylformamide), U.S. Pat. No. 5,470,903. However, owing to the strong hydrophilicity of these materials, films of these polymer dispersions are very sensitive to water. This sensitivity to water greatly restricts the fields of use of such materials. For instance, materials of this kind cannot be used for exterior applications since the polymer is degraded very rapidly by weathering.

For practical applications, therefore, it is a great problem to achieve the right balance in the hydrophilicity of the protective colloids such that, on the one hand, the emulsion polymerization can be readily carried out and, on the other hand, the polymers prepared therewith possess the necessary water resistance.

Protective colloids are also utilized in order to achieve very specific rheological properties of dispersions: for example, a defined yield point. These rheological properties are very important if, for example, such copolymer dispersions are used as components of synthetic-resin plasters.

It is an object of the present invention to provide novel protective colloids which permit the preparation of mechanically stable copolymer dispersions having particular rheological properties.

The object has been achieved by a colloid dispersion mixture obtained by copolymerizing a water-soluble monomer with a water-insoluble comonomer in the presence of a micelle-forming emulsifier.

SUMMARY OF THE INVENTION

It has surprisingly been found that in the presence of an emulsifier which forms micelles the copolymerization of a water-soluble monomer with a water-insoluble comonomer leads to colloid dispersion mixtures of the copolymer. These colloid dispersion mixtures are highly suitable as protective colloids for the preparation of, for example, copolymer dispersions comprising vinyl acetate.

DESCRIPTION OF THE PREFERRED EMBODIMENTS

Emulsifiers stabilize the finely disperse polymer particles produced by the emulsion polymerization. The emulsifiers are usually surface-active substances, or surfactants. Surfactants have a characteristic structure and possess at least one hydrophilic and one hydrophobic functional group. By virtue of this structure surfactants are able to accumulate at the interface between polymer phase and water phase and by means of steric and/or electrostatic effects to prevent coalescence of the finely dispersed polymer particles. If the hydrophilic portion has no electrical charge, the emulsifier is said to be nonionic; if it has a negative charge, it is referred to as an anionic emulsifier; and, if positive charges are present, the compound is a cationic emulsifier. When surfactants are added to water, above a certain concentration there is formation of spherical micelles. It is this property of surfactants which is of great importance for the implementation of emulsion polymerization. This concentration, called the critical micelle concentration (CMC), is specific to each individual surfactant. If the concentration in water is raised significantly above the CMC, the aggregation behavior of the surfactants is changed and elongated micelles (rod micelles), for example, are formed. Suitable emulsifiers for the invention described herein include both nonionic and ionic emulsifiers. Examples of these are alkylaryl polyglycol ethers and alkyl polyglycol ethers each having from 3 to 50 mol of ethylene oxide units, block copolymers of ethylene oxide with propylene oxide, alkylsulfonates or alkylarylsulfonates, alkyl sulfates, alkyl and aryl ether sulfates and phosphates each having preferably 8 to 18 carbon atoms in the lipophilic portion and up to 50 ethylene oxide or propylene oxide units in the hydrophilic portion, and also mono- or diesters of sulfosuccinic acid, or alkylphenols having in each case preferably 8 to 18 carbon atoms in the alkyl radical.

It is preferred to employ nonionic emulsifiers and mixtures of ionic with nonionic emulsifiers.

Water-soluble monomers preferably employed are N-methyl-N-vinylacetamide, N-vinylpyrrolidone or N-vinylformamide; as water-insoluble comonomers it is preferred to employ unsubstituted or alpha-substituted esters of acrylic acid. Preference is given to the alkyl esters of acrylic or methacrylic acid, especially the $C_4$ to $C_8$ alkyl esters, such as butyl or ethylhexyl esters. It is also possible to employ mixtures of the acrylic esters, or other monomers, such as esters of maleic acid, for example; preferably dioctyl maleate.

The copolymerization is carried out as a free-radical addition polymerization at temperatures from 15 to 100° C., in particular from 60 to 90° C.; as the free-radical initiator it is possible to employ both water-insoluble compounds such as 2,2'-azobisisobutyronitrile or 2,2'-azobis(2-methylbutyronitrile) or water-soluble compounds such as 2,2'-azobis(2-amidinopropane) dihydrochloride.

The invention also provides a process for preparing the colloid dispersion mixture of the invention, which comprises subjecting a water-soluble monomer to free-radical polymerization with a water-insoluble comonomer in the presence of a micelle-forming emulsifier.

The invention additionally provides for the use of the colloid dispersion mixture as a protective colloid for emulsion polymerization.

Suitable monomers for use in the emulsion polymerization for preparing homo- or copolymeric polyvinyl esters are vinyl formate, vinyl acetate, vinyl propionate, vinyl isobutyrate, vinyl pivalate, vinyl-2-ethylhexanoate, vinyl esters of saturated branched monocarboxylic acids having 9 or 10 carbon atoms in the acid residue, vinyl esters of relatively long-chain, saturated or unsaturated fatty acids, such as vinyl laurate, vinyl stearate, and also vinyl esters of benzoic acid and substituted derivatives of benzoic acid, such as vinyl p-tert-butylbenzoate. Among these, however, particular preference is given to vinyl acetate. Said vinyl esters can also be present alongside one another in the polyvinyl ester. The proportion of said vinyl esters in the polymer is at least 50% by weight, preferably at least 75% by weight.

Further ethylenically unsaturated monomers which can be copolymerized with the vinyl esters are α,β-unsaturated acids, examples being acrylic acid and methacrylic acid, and esters thereof with primary and secondary saturated monohydric alcohols having 1 to 18 carbon atoms, examples being methanol, ethanol, propanol, butanol, 2-ethylhexyl alcohol, cycloaliphatic alcohols, and also relatively long-chain fatty alcohols. It is also possible to use α,β-unsaturated dicarboxylic acids, examples being maleic, fumaric, itaconic and citraconic acid, and their mono- or diesters with saturated monohydric aliphatic alcohols having 1 to 18 carbon atoms. The proportion of the overall monomer amount accounted for by these comonomers is up to 25% by weight, preferably 15% by weight.

Further suitable comonomers are ethylenically unsaturated hydrocarbons, such as ethylene or α-olefins having 3 to 18 carbon atoms, examples being propylene, butylene, and also styrene, vinyltoluene, vinylxylene and also halogenated unsaturated aliphatic hydrocarbons, examples being vinyl chloride, vinyl fluoride, vinylidene chloride and vinylidene fluoride. The proportion of the overall monomer amount accounted for by these comonomers is up to 50% by weight, preferably up to 25% by weight.

It is also possible for polyethylenically unsaturated monomers to be present in the polymer, examples being diallyl phthalate, diallyl maleate, triallyl cyanurate, tetraallyloxyethane, divinylbenzene, 1,4-butanediol dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate. The proportion of the overall monomer amount accounted for by these comonomers is up to 10% by weight, preferably up to 2% by weight.

Nitrogen-containing comonomers with N-functional groups are particularly suitable, including in particular (meth)acrylamide, allyl carbamate, acrylonitrile, N-methylol(meth)acrylamide, N-methylolallyl carbamate and also the N-methylol esters, N-methylolalkyl ethers or Mannich bases of N-methylol(meth)acrylamide or of N-methylolallyl carbamate, acrylamidoglycolic acid, methyl acrylamidomethoxy acetate, N-(2,2-dimethoxy-1-hydroxyethyl)acrylamide, N-dimethylaminopropyl(meth) acrylamide, N-methyl(meth)acrylamide, N-butyl(meth) acrylamide, N-cyclohexyl(meth)acrylamide, N-dodecyl (meth)-acrylamide, N-benzyl(meth)acrylamide, p-hydroxyphenyl(meth)acrylamide, N-(3-hydroxy-2,2-dimethylpropyl)methacrylamide, ethyl imidazolidonemethacrylate, N-vinylformamide and N-vinyl-2-pyrrolidone. The proportion of the overall monomer amount accounted for by these comonomers is up to 15% by weight, preferably up to 10% by weight.

Further particularly suitable comonomers are hydroxyfunctional monomers, such as hydroxyethyl (meth)acrylate, hydroxypropyl (meth)acrylate, and adducts thereof with ethylene oxide or propylene oxide. The proportion of the overall monomer amount accounted for by these comonomers is up to 25% by weight, preferably up to 15% by weight.

Also suitable, in addition, are comonomers from the group diacetoneacrylamide, allyl acetoacetate, vinyl acetoacetate and acetoacetoxyethyl (meth)acrylate. The proportion of the overall monomer amount accounted for by these comonomers is up to 10% by weight, preferably up to 5% by weight.

The protective colloid of the invention permits the preparation of mechanically stable copolymer dispersions having high viscosities in the lower shear range (D=0.05–1 s$^{-1}$) and a pronounced flow point (yield point). The yield point is the shear stress below which a substance acts as a solid. This means that the action of a shear stress which is smaller than the yield point does not lead to any permanent deformation, or only to a negligible creep movement. The yield point is an important property of numerous disperse systems, such as coatings, foodstuffs and pharmaceutical products. It is the yield point which determines, for example, whether a paint forms a smooth surface, whether toothpaste drops off the brush, or whether a material can be pumped, and many other things. These properties of a dispersion can be obtained by various means: the yield point, for example, can be raised by increasing the concentration of the protective colloid or by varying the acrylic ester comonomer. The proportion of the protective colloid can lie within a broad range. Hence the proportion of the protective colloid can be from 0.05 to 10% by weight, with the preferred proportion being between 0.5 and 5% by weight.

The examples described below illustrate the invention but are not intended to effect any restriction. Percentages are always by weight.

EXAMPLE 1

Preparing a protective colloid comprising N-vinylpyrrolidone and 2-ethylhexyl acrylate 1.6 g of sodium carbonate and 23 g of Emulsogen EPN 287 (fatty alcohol polyglycol ether, Clariant) are dissolved in 497 g of deionized water. The solution is heated to 80° C. At this temperature a mixture of 300 g of vinylpyrrolidone and 100 g of 2-ethylhexyl acrylate is metered in over 180 minutes. In parallel with this, a solution of 2 g of azobisisobutyronitrile in N-vinyl-2-pyrrolidone is metered in. After the end of the metered addition of monomer, the reaction mixture is heated at 80° C. for 90 minutes, cooled and drained through a 180 μm filter at below 30° C.

The colloid dispersion mixture has the following properties:

| Solids content | 30.3% |
|---|---|
| K value | 66 |
| Particle size distribution from Mastersizer measurement | |
| Volume(mass) fractions: | dv(10%) 0.127 μm |
| | dv(50%) 0.418 μm |
| | dv(90%) 1.623 μm |
| N-Vinyl-2-pyrrolidone | 600 ppm |
| 2-Ethylhexyl acrylate | <25 ppm |

EXAMPLE 2

Preparing a protective colloid comprising N-vinylformamide and dioctyl maleate 1.6 g of sodium carbonate and 16 g of Arkopal N 308 (nonylphenol polyglycol ether with 30 EO, Clariant) are dissolved in 500 g of deionized water. The solution is heated to 80° C. At this temperature a mixture of 340.6 g of N-vinylformamide and 59.4 g of dioctyl maleate is metered in over 180 minutes. In parallel with this, a solution of 2 g of azobisisobutyronitrile in N-vinylformamide is metered in. After the end of the metered addition of monomer, the reaction mixture is heated at 80° C. for 90 minutes, cooled and drained through a 180 µm filter at below 30° C.

The colloid dispersion mixture has the following properties:

| Solids content | 34% |
| --- | --- |
| K value | 73.8 |
| Particle size distribution from Mastersizer measurement | |
| Volume(mass) fractions: | dv(10%) 0.322 µm |
|  | dv(50%) 0.715 µm |
|  | dv(90%) 1.321 µm |
| N-Vinylformamide | <0.1% |
| Dioctyl maleate | 1.4% |

EXAMPLE 3

Preparing a Vina/NeoVa 10 copolymer dispersion with a protective colloid of the invention 52.1 g of the colloid dispersion mixture from Example 1, 40 g of Arkopal N 308 (nonylphenol polyglycol ether with 30 EO, Clariant) and 3.3 g of sodium acetate are dissolved in 788 g of deionized water. The solution is heated slowly. While it is being heated, 10% of a mixture of 720 g of vinyl acetate (Vina) and 80 g of vinyl ester of Versatic acid (VeoVa 10) is added. At approximately 60° C., 0.58 g of ammonium persulfate (APS) dissolved in 16 g of deionized water is added and the mixture is heated to 80° C. After polymerization has set in, the metered addition of monomer mixture and initiator (1.6 g of APS in 32 g of water) over 180 minutes at 80° C. is commenced. The mixture is subsequently heated at 80° C. for 1 hour. It is then cooled to room temperature and drained through a 180 µm filter.

The dispersion has the following properties:

| Solids content | 49.0% |
| --- | --- |
| Sieve residue (above 40 µm) | 0.03% |
| Particle size: Argon aerosol [nm] (dw/dn) | 334 (1.54) |
| Brookfield viscosity (spindle 5/20 rpm) | 12 Pa.s |
| WP/FR | 11/13° C. |
| Yield point | 16 Pa |

EXAMPLE 4

Preparing a Vina/ethylene copolymer dispersion with a protective colloid of the invention 845 g of the colloid dispersion mixture from Example 1, 581 g of Arkopal N 308 (nonylphenol polyglycol ether with 30 EO, Clariant), 47 g of sodium acetate, 61 g of sodium ethenesulfonate (30%) and 33.6 g of potassium persulfate are dissolved in 10,880 g of deionized water. In a reactor, the solution is blanketed with nitrogen three times while stirring. At 25° C., 685 g of vinyl acetate (Vina) are added and the ethylene pressure is set to 25 bar. The solution is heated slowly. At 67° C., the metered addition of 10,739 g of vinyl acetate over 340 minutes and of the redox components (19.2 g of $Na_2S_2O_5$ in 360 g of water) over 370 minutes is begun. Following the end of metering, 11.2 g of sodium persulfate in 480 g of deionized water are added and the reaction solution is subsequently heated at 85° C. for 2 hours. It is then cooled to room temperature and drained through a 180 µm filter.

The dispersion has the following properties:

| Solids content | 51.2% |
| --- | --- |
| Sieve residue (above 40 µm) | 0.03% |
| Particle size: Argon aerosol [nm] | 331 |
| Brookfield viscosity (spindle 5/20 rpm) | 6.8 Pa.s |
| Yield point | 5.8 Pa |

I claim:

1. A colloid dispersion mixture for use as protective colloid for aqueous emulsion polymerization, the colloid dispersion mixture obtained by copolymerizing a water-soluble monomer selected from the group consisting of N-methyl-N-vinylacetamide, N-vinyl-2-pyrrolidone and N-vinylformamide with a water-insoluble comonomer that is an unsubstituted or alpha-substituted ester of acrylic acid or an ester of maleic acid in the presence of a micelle-forming emulsifier wherein the proportion of water-soluble monomer of the total monomer content is from about 75% to about 90%.

2. A colloid dispersion mixture as claimed in claim 1, wherein N-vinyl-2-pyrrolidone is employed as water-soluble monomer and an alkyl ester of acrylic or methacrylic acid is employed as water-insoluble monomer.

3. A colloid dispersion mixture as claimed in claim 1, wherein butyl or ethylhexyl acrylate or dioctyl maleate is employed as water-insoluble monomer.

4. A colloid dispersion mixture as claimed in claim 1, wherein nonionic emulsifiers or mixtures of ionic with nonionic emulsifiers are employed as emulsifiers.

5. A colloid dispersion mixture as claimed in claim 1, wherein alkylaryl polyglycol ethers or alkyl polyglycol ethers each having from 3 to 50 mol of ethylene oxide units, block copolymers of ethylene oxide with propylene oxide, alkylsulfonates or alkylarylsulfonates, alkyl sulfates, alkyl and aryl ether sulfates and phosphates each having preferably 8 to 18 carbon atoms in the lipophilic portion and up to 50 ethylene oxide or propylene oxide units in the hydrophilic portion, and also mono- or diesters of sulfosuccinic acid, or alkylphenols having in each case preferably 8 to 18 carbon atoms in the alkyl radical, are employed as emulsifiers.

6. A colloid dispersion mixture as claimed in claim 1, wherein the copolymerization is conducted as a free-radical addition polymerization.

7. A colloid dispersion mixture as claimed in claim 1, wherein the copolymerization is conducted at from 60 to 90° C.

8. A process for preparing a colloid dispersion mixture as claimed in claim 1, which comprises subjecting a water-soluble monomer to free-radical polymerization with a water-insoluble comonomer in the presence of a micelle-forming emulsifier.

9. A emulsion polymerization process, wherein a colloid dispersion mixture as claimed in claim 1 is used as a protection colloid.

10. A process as claimed in claim 9, wherein the proportion of the protective colloid is from 0.1 to 5% by weight (based on the overall monomer amount).

11. A process for the copolymerization of vinylacetate, wherein a colloid dispersion mixture as claimed in claim 1 is used as a protective colloid.

12. A process as claimed in claim 11, wherein the proportion of the protective colloid is from 0.1 to 5% by weight (based on the overall monomer amount).

13. A colloid dispersion mixture comprising a copolymer of N-vinyl-2-pyrrolidone and 2-ethylhexyl acrylate or a copolymer of N-vinylformamide and dioctyl maleate.

* * * * *